United States Patent [19]

Miller et al.

[11] Patent Number: 5,171,795
[45] Date of Patent: Dec. 15, 1992

[54] PROCESS FOR THE PRODUCTION OF IMPROVED POLYAMINOPOLYAMIDE EPICHLOROHYDRIN RESINS

[75] Inventors: Andrew J. Miller; Brian M. Stubbs, both of Kent, England

[73] Assignee: Hercules Incorporated, Wilmington, Del.

[21] Appl. No.: 561,860

[22] Filed: Aug. 1, 1990

[51] Int. Cl.⁵ .............................................. C08G 69/48
[52] U.S. Cl. ..................................... 525/430; 525/435
[58] Field of Search ................................ 525/430, 435

[56] References Cited

U.S. PATENT DOCUMENTS

| | | |
|---|---|---|
| 2,926,116 | 2/1960 | Keim . |
| 3,197,427 | 7/1965 | Schmaltz .......................... 260/29.2 |
| 3,891,589 | 6/1975 | Ray-Chauduri ............ 260/29.2 EP |
| 4,857,586 | 8/1989 | Bachem et al. ..................... 524/845 |

FOREIGN PATENT DOCUMENTS

| | | |
|---|---|---|
| 0349935 | 1/1989 | European Pat. Off. . |
| 0332967 | 6/1989 | European Pat. Off. . |
| 0374938 | 6/1990 | European Pat. Off. . |
| 865727 | 4/1961 | United Kingdom . |

Primary Examiner—Harold D. Anderson
Attorney, Agent, or Firm—Roslyn T. Tobe

[57] ABSTRACT

A process for the manufacture of improved water soluble polyaminopolyamide-epichlorohydrin resins is disclosed. The polyaminopolyamide-epichlorohydrin reaction is continued until between 70% to 100% of the total charge of epichlorohydrin has reacted. The polyaminopolyamide-epichlorohydrin mixture is then treated with a specified amount of a halogen-free mineral acid. Preferably the mineral acid is selected from the group consisting of sulphuric acid, phosphoric acid, nitric acid and sodium hydrogen sulphate. Following the completion of the acid addition the reaction is continued to effect at least a 10% reduction in the polymer bound organochlorine concentration, based on the composition of the reaction mixture at the time of the acid addition.

18 Claims, No Drawings

PROCESS FOR THE PRODUCTION OF IMPROVED POLYAMINOPOLYAMIDE EPICHLOROHYDRIN RESINS

The present invention relates to a process for the production of improved polyaminopolyamide-epichlorohydrin resins. Polyaminopolyamide-epichlorohydrin resins have been used commercially for several decades for such uses as neutrally curing wet strength resins in the manufacture of paper products, as cross-linking agents for carboxylated latices, and as emulsifying and dispersing agents. Polyaminopolyamide-epichlorohydrin resins are defined as resins prepared from an aqueous solution of a polyamide resin having a secondary amine group in its recurring polymer unit and epichlorohydrin. A method of preparation of this kind of resin is found in GB 865,727 to Keim.

While these resins have proven to be remarkably successful for these commercial purposes, environmental and economic considerations expose shortcomings in the synthesis, nature and properties of these commercially available resins.

Some of the drawbacks associated with these resins are the presence of substantial amounts of the low molecular weight epichlorohydrin by-products 1,3 dichloropropan 2-ol (DCP) and 1-chloro-2,3 propanediol (CPD) and the presence of a substantial amount of polymer bound organochlorine. DCP and CPD can be detrimental to the environment because of their suspected carcinogenicity and their persistence in the environment. The polymer bound organochlorine arises from the presence of N-chlorohydrin groups.

When these resins are prepared using economically attractive higher solids reaction mixtures (greater than about 15%), cross-linking proceeds relatively more rapidly than the simultaneous isomerisation of N-chlorohydrin groups to 3-hydroxyazetidinium chloride groups. Cross-linking leads to viscosity increases in the resins. This results in resins of decreased cationicity compared to resins prepared using lower solids reaction mixtures.

Many known resin syntheses employ molar excesses of epichlorohydrin on polyaminopolyamide in order to effect adequate process control in the resin cross-linking step to reduce the risk of gelation of the reaction mixture. The molar excesses result in higher product costs because of the formation of higher levels of the epichlorohydrin residuals DCP and CPD.

It is the overall object of the invention to provide a process whereby these shortcomings can be simultaneously overcome resulting in resins having substantially lower contents of DCP and CPD; resins having lower contents of polymer bound organohalogen; and resins prepared in such a way that the resin cross-linking reaction is inhibited while the isomerisation of neutral N-chlorohydrin groups to cationic 3-hydroxyazetidinium groups is inhibited to a much lesser extent optionally enabling the use of higher solids reaction mixtures.

Typically polyaminopolyamide-epichlorohydrin resins are prepared by reacting a polyamide, derived from a polyalkylene polyamine and a saturated apliphatic dibasic carboxylic acid containing from 3–10 carbon atoms, with epichlorohydrin. In carrying out the reaction, U.S. Pat. No. 2,926,116 to Keim and GB 865,727 to Keim teach the use of an amount of dibasic acid sufficient to react substantially completely with the primary amine groups of the polyalkylene polyamine but insufficient to react with the secondary amine group to any substantial extent. This will usually require a mole ratio of polyalkylene polyamine to dibasic acid of from about 0.8:1 to about 1.4:1. This reaction is preferably carried out at temperatures between 160° C. and 210° C. but may vary from 110° C. to 250° C.

In converting the polyamide, formed as described above, to a cationic thermosetting resin; the polyamide is reacted with epichlorohydrin at a temperature of about 45° C. to about 100° C., preferably from about 45° C. to 70° C., until the viscosity of a 20% solids solution at 25° C. has reached C or higher on the Gardner Holdt scale. When the desired viscosity is reached, sufficient water is then added to adjust the solids content of the resin solution to the desired amount, usually about 10%. The product is then cooled to about 25° C. then stabilized by adding sufficient acid to reduce the pH to about 6 and preferably to about 5. Any suitable acid such as hydrochloric, sulphuric, nitric, formic, phosphoric, and acetic acid may be used to stabilize the product.

Great Britain Patent 865,727 also discloses that solids concentrations of epichlorohydrin-polyamide adduct of more than 40% solids may be prepared.

U.S. Pat. No. 3,891,589 to Ray-Chaudhuri is a process for preparing cationic thermosetting resins which exhibit improved stability at high total solids content. Epichlorohydrin is added to a polyamide-polyamine intermediate in a concentration ranging from 1.25 to 4.0 moles of epichlorohydrin per equivalent weight of polyamide intermediate. The reaction mixture is heated to 25° C. to 40° C. over a period of 1 to 4 hours. The temperature is then increased to 50° C. to 90° C. When the desired viscosity is obtained, the resin solution is cooled, diluted, and the pH is adjusted by adding sulfuric, nitric, hydrochloric, oxalic or acetic acid. This process relies on control and selection of the process variables as noted at col. 2, lines 15–16.

U.S. Pat. No. 3,197,427 to Schmaltz discloses in columns 3 and 4 that in the epichlorohydrin-polyamide reaction, 0.5 moles to about 1.8 moles of epichlorohydrin per mole of polyamide secondary amine is used. The patent further discloses that the epichlorohydrin-polyamide reaction may be modified by decreasing the pH of the aqueous polyaminoamide solution to about 8.5 to 9.5 with acid prior to the addition of epichlorohydrin or immediately after the addition of epichlorohydrin. Any suitable acid, e.g. mineral acids can be used for this purpose. When the desired viscosity is reached, the product is cooled to about 25° C. and then stablized by reducing the pH to about 2.5 to 3.0 by the conjoint use of formic acid and sulfuric acid.

U.S. Pat. No. 4,857,586 to Bachem et al. discloses reacting epichlorohydrin-polyamide reaction products with inorganic bases and subsequent reaction of the resulting compounds which contain epoxy groups with halogen-free acids or derivatives to give compounds containing 1-acyloxy-2-hydroxypropyl groups.

European Patent Application EP 0349,935 describes a reaction in which alkali is added which may then be neutralized or partly neutralized during the synthesis of epichlorohydrin-polyamide resins.

The represent invention relates to a process for the synthesis of improved polyaminopolyamide-epichlorohydrin resins, resins when prepared by this process, and to materials treated with the resins prepared by this process.

A key element of the invention is that a specified quantity of a halogen-free mineral acid is added to the reaction mixture after the major part of the epichlorohydrin charge has alkylated the polyaminopolyamide resin. Addition of a halogen-free mineral acid at this time results in lower levels of the epichlorohydrin residuals, DCP and CPD, than would be formed if the halogen-free mineral acid was added prior or or simultaneously with the addition of epichlorohydrin. Other advantages are an improved degree of process control during resin viscosity development and higher degrees of conversion of N-chlorohydrin groups to 3-hydroxyazetidinium groups during the resin cross-linking step, for a given reaction mixture viscosity.

A primary object of the invention is to provide a process for the synthesis of improved epichlorohydrin polyaminopolyamide resins by:

(a) enabling higher degrees of conversion of N-chlorohydrin (NCH) groups, to 3-hydroxyazetidinium chloride (AZE) groups particularly for higher solids reactions, and so yielding resins having a lower polymer bound organochlorine content and higher cationicity;

(b) enabling resins to be synthesized having lower levels of the epichlorohydrin reaction by-products DCP and CPD; and (c) enabling improved process control by reducing the rate of viscosity increase during the synthesis of the invention resins compared to like resins prepared using prior procedures; and (d) particularly facilitating the synthesis of resins prepared using a molar or submolar ratio of epichlorohydrin to polyaminipolyamide secondary amine content.

While the art disclosures cited above may overlap in any one of these areas, it must be recognized that it is the combined presence of all of these variables in the novel process of this invention that provides the improved and unexpected results.

SUMMARY OF THE INVENTION

The invention relates to a process for the synthesis of improved, water soluble polyaminopolyamide-epichlorohydrin resins comprising reacting the polyaminopolyamide resin with epichlorohydrin at a temperature of about 20° C. to 60° C. until at least 70% of the total charge of epichlorohydrin has reacted. The liquid polymer solution is then treated with about 0.1% to 30% of a molar equivalent first divided by the acid proticity of a halogen-free mineral acid at a temperature of about 20° C. to 100° C. Following the completion of the acid addition, the reaction is continued to effect at least a 10% reduction in the polymer bound organochlorine concentration, based on the composition of the reaction mixture at the time of the acid addition.

While not wishing to be bound by theory, we believe that the addition of a halogen-free mineral acid in accordance with the present invention will extend the time it takes for the resin to cross-link. The longer reaction times encountered by adding acid can be explained by protonation of nucleophilic and basic groups on the polymer chains. Resins prepared using molar or submolar quantities of epichlorohydrin based on the secondary amino content of the polyaminopolyamide resin are likely to be richer in nucleophilic sites than resins prepared using molar excess of epichlorohydrin. These nucleophilic sites are, we believe, capable of reacting with glycidylamine and 3-hydroxyazetidinium groups to give cross-links. By adding mineral acid at the appropriate time, the nucleophilic sites are rendered non-nucleophilic through protonation.

Further it is our belief that advantage accures in adding acid toward the end of the alkylation step to avoid reducing the rate of the epichlorohydrin alkylation reaction through protonation of otherwise epichlorohydrin reactive species on the polymer and thereby permitting the formation of higher concentrations of DCP and CPD epichlorohydrin residuals through epichlorohydrin side reactions.

By reducing the rate of cross-linking of the alkylated resin the organohalogen content reducing reaction of N-chlorohydrin groups cyclizing to non-organohalogen containing 3-hydroxyazetidinium chloride groups is permitted to proceed relatively uninhibited. We postulate that the N-chlorohydrin group is both a weaker base than other available poloymer groups thus it is pro-rata less protonated on acid addition according to the invention and it is less nucleophilic towards the potential resin cross-linking groups such as glycidylamine and 3-hydroxyazetidinium chloride so the cross-linking rate is reduced.

DETAILED DESCRIPTION OF THE INVENTION

The present invention relates to a process for the synthesis or manufacture of improved water soluble polyaminopolyamide-epichlorohydrin resins comprising the following steps:

1. reacting an aqueous concentration of about 13.5% w/w to 70% w/w, preferably about 20% to 60% of polyaminopolyamide resin with about 0.05 to 1.5 molar equivalents of epichlorohydrin, based on the secondary amine content of the starting polyaminopolyamide resin, at a temperature not exceeding 60° C. and preferably between 20° C. to 45° C. to give a liquid polymer solution wherein about 70% to 100%, preferably about 90% to 100%, of the total charge of epichlorohydrin has reacted. Preferably about 0.5 to 1.1 molar equivalents of epichlorohydrin based on the secondary amine content of the starting polyaminopolyamide resin is used in the reaction.

2. adding between 0.1% and 30%, preferably between 0.5% and 20%, of a molar equivalent first divided by the acid proticity of a halogen-free mineral acid, based on the original secondary amine content of the starting polyaminopolyamide resin, at a temperature of between 20° and 100° C., preferably between 30° C. and 60° C. The preferred halogen-free mineral acids are selected from the group consisting of sulphuric, phosphoric, nitric, and sodium hydrogen sulphate.

3. continuing the reaction at about 20° C. to 100° C., preferably about 50° C. to 90° C. to effect at least a 10% reduction in the polymer bound organchlorine concentration, based on the composition of the reaction mixture at the time of the acid addition.

Optionally the process may comprise other steps such as dilution steps and the addition of further acid at the end of the resin synthesis.

Preferred reactants for the synthesis of the starting polyaminopolyamide resins are diethylenetriamine and adipic or glutaric acids.

Resins where molar or submolar ratios of epichlorohydrin on the polyaminpolyamide can be used.

Suitable polyaminopolyamides for this invention are synthesized beforehand and then reacted with epichlorohydrin. Preferred polyaminopolyamides are prepared by the polycondensation of polyalkylene polyamines and dicarboxylic acids or dicarboxylic acid mono or di-$C_1$-$C_4$ alkyl esters to give water soluble long chain polymers having the following recurring polymer units:

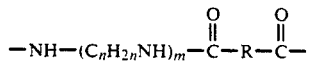

Where n and m can be individually 2 or more and R is a linear $C_1$ to about $C_8$ aliphatic diradical. Deliberately or adventitiously additional chain linkages may be introduced, thus in the case of the former, ethylene diamine on caprolactam for example may be added and incorporated into the substantially linear polymer, in the case of the latter impurities in commercial grades of polyalkyleneamines may be introduced through reaction into the polymer structure, perhaps forming chain termini. Such polymers are within the scope and spirit of the invention provided they are water soluble.

Diethylenetriamine and adipic acid are particularly preferred starting materials for the preparation of the polyaminopolyamides used in the present invention. Typically the two reactants are blended and heated together under controlled conditions (160° C.–210° C.) in such molar proportions that substantially all the primary amino groups but as few as possible of the secondary amine groups are acylated during the polycondensation reaction. The course and completeness of the polycondensation reaction can be usefully monitored by collecting and measuring the mass or volume of the water condensate.

The present invention chiefly relates to the epichlorohydrin alkylation step and beyond as described above.

To further illustrates the invention by way of examples five resins were prepared; four in accordance with the invention and a control not benefiting from the acid addition.

In each preparation a 50% aqueous solution of a commercial polyaminopolyamide resin (Polymer 567 (P567), Hercules Inc.), 300 g dry basis, was reacted with the same mole ratio (approximately 0.8 based on the calculated secondary amine content of the resin,) of epichlorohydrin (104.3 g) for 120 minutes at 40°–45° C.

respectively compared to 70 minutes for the control resin. The AOX percentages presented in Table 1 were determined consistent with DIN 38409 1 part 14 which is a West German analytical standard for determining the adsorbable organochlorine content of water incorporated herein by reference. The DCP and CPD concentrations were determined by gas-liquid chromatography. These results show that the longer reaction times of the test resins have led to lower levels of determined adsorbable organochlorine and polymer bound organochlorine in the finished resins compared to control.

What we claim is:

1. A method for synthesizing in a two stage reaction water soluble polyaminopolyamide-epichlorohydrin resin having lower polymer bound organochlorine content comprising:
   (a) reacting an aqueous solution of a polyaminopolyamide resin having a concentration of about 13.5% to 70% to alkylate same with from about 0.05 to 1.5 molar equivalents of epichlorohydrin based on the secondary amine nitrogen content of the polyaminopolyamide resin to form N-chlorohydrin groups at a temperature not exceeding 60° C. until about 70% to 100% of the total charge of epichlorohydrin has reacted;
   (b) adding from about 0.1% to 30% of an equivalent of a halogen-free mineral acid based on the original secondary amine nitrogen content of the polyaminopolyamide resin at a temperature of from about 20° C. to 100° C.; and
   (c) continuing the reaction at a temperature of about 20° C. to 100° C. to isomerize N-chlorohydrin groups to 3-hydroxy-azetidinium chloride groups and to cross-link the resin and effect at least a 10% reduction in the polymer bound organochlorine concentration, based on the composition of the reaction mixture at the time of the acid addition.

2. A method as recited in claim 1 wherein the halogen-free mineral acid is selected from the group consisting of sulphuric acid, phosphoric acid, nitric acid, and sodium hydrogen sulphate.

3. A method as recited in claim 1 wherein the halogen-free mineral acid is sulphuric acid.

4. A method as recited in claim 1 wherein the polyaminopolyamide resin reacted with epichlorohy-

TABLE 1

| Resin No. | Cook Time mins | % Mole Equivalent $H_2SO_4$/Proticity per Mole of P567 | Mole Ratio $H_2SO_4$/Polymer 567 | Adsorbable Organohalogen % | DCP ppm | CPD ppm | PBOC % | % Reduction PBOC |
|---|---|---|---|---|---|---|---|---|
| 1* | 70 | 0 | 0.00 | 0.411 | 434 | 143 | 0.387 | 0 |
| 2 | 150 | 21.2 | 0.106 | 0.258 | 718 | 184 | 0.219 | 43.4 |
| 3 | 150 | 10.8 | 0.054 | 0.236 | 640 | 147 | 0.201 | 48.06 |
| 4 | 117 | 5.2 | 0.026 | 0.267 | 578 | 172 | 0.235 | 39.28 |
| 5 | 87 | 2.6 | 0.013 | 0.322 | 475 | 135 | 0.296 | 23.51 |

*(control)
PBOC (calc) = Calculated Polymer Bound Organochlorine
PBOC = [AOX %] − [(0.55)(DCP %)] 0.55 is the mass fraction of chlorine atoms in DCP After that time $H_2SO_4$ (98% W/W), was added in accordance with the invention together with dilution water 903.4 g and the resulting mixture heated to 60° C. until either a Gardner Holdt viscosity of D to E was reached or a 60° C. cook time of 150 minutes was exceeded.

The resins were finished by likewise dilution and acidification and the figures were adjusted to a consistent 12.5% total solids basis. In the cases of resins 2 and 3 Gardner Holdt viscosities of B and B+ were obtained respectively. For resins 4 and 5 the Gardner Holdt viscosity of D to E was achieved in 117 and 87 minutes drin has a concentration if from about 20% to 60%.

5. A method as recited in claim 1 wherein the polyaminopolyamide-epichlorohydrin reaction continues until about 90% to 100% of the total charge of epichlorohydrin has reacted.

6. A method as recited in claim 1 wherein the polyaminopolyamide-epichlorohydrin reaction is carried out at a temperature of about 20° C. to about 45° C.

7. A method as recited in claim 1 wherein about 0.5 to 1.1 molar equivalents of epichlorohydrin are added to the polyaminopolyamide resin.

8. A method as recited in claim 3 wherein the addition of the mineral acid is carried out at a temperature of about 30° C. to about 60° C.

9. A method as recited in claim 3 wherein the reaction of polyaminopolyamide-epichlorohydrin and the halogen-free mineral acid is continued at a temperature of about 50° C. to about 90° C.

10. A method as recited in claim 2 wherein about 0.5% to 20% of an equivalent of the halogen-free mineral acid is added.

11. A method as recited in claim 1 wherein the polyaminopolyamide resin is a water soluble long chain polymer having the following polymer recurring units

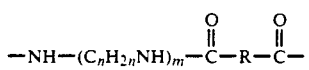

where n and m can be individually 2 or more and R is a linear $C_1$ to $C_8$ aliphatic diradical.

12. A method as recited in claim 11 wherein the polyaminopolyamide resin is prepared by the polycondensation of polyalkylene polyamines and dicarboxylic compounds selected from the group consisting of dicarboxylic acids, dicarboxylic acid mono $C_1$-$C_4$ alkyl esters, and dicarboxylic acid di $C_1$-$C_4$ alkyl esters.

13. A method as recited in claim 12 wherein the polyaminopolyamide is prepared from diethylenetriamine and adipic acid.

14. A method for preparing in a two stage reaction water soluble polyaminopolyamide-epichlorohydrin resins having lower polymer bound oranochlorine content comprising:

(a) reacting an aqueous solution of a polyaminopolyamide resin having a concentration of about 20% to 60% from diethylenetriamine and adipic acid to alkylate same with about 0.5 to 1.1 molar equivalents of ephichlorohydrin based on the secondary amine nitrogen content of the polyaminopolyamide resin to form N-chlorohydrin groups at a temperature of about 20° C. to 45° C. until about 90% to 100% of the total charge of epichlorohydrin has reacted;

(b) addding from about 0.5% to 20% of an equivalent of a mineral acid selected from the group consisting of sulfuric acid, phosphoric acid, nitric acid, and sodium hydrogen sulphate based on the original secondary amine nitrogen content of the polyaminopolyamide resin at a temperature of about 30° C. to 60° C.; and (c) continuing the reaction at a temperature of about 50° C. to 90° C. to isomerize N-chlorohydrin groups to 3-hydroxyazetidinium chloride groups and to cross-link the resin and effect at least a 10% reduction in the polymer bound organochlorine concentration, based on the composition of the reaction mixture at the time of the acid addition.

15. A method as recited in claim 14 wherein the mineral acid is sulphuric acid.

16. A method as recited in claim 14 wherein about 50% of the polyaminopolyamide resin having a concentration of about 50% is reacted with about 0.8 molar equivalents of epichlorohydrin at about 40° C. to 45° C.; adding about 2.0% to 22% of an equivalent of sulfuric acid at a temperature of about 40° C. to 60° C.; and continuing the reaction at a temperature of about 60° C. to effect at least a 5% reduction in the polymer bound organochlorine concentration based on the composition of the reaction mixture at the time of the acid addition.

17. A water soluble polyaminopolyamide-epichlorohydrin composition containing from about 0.01% to 1.0% epichlorohydrin residual where the epichlorohydrin residual is the sum of the 1,3-dichloro-2-propanol and 1-chloro-2,3-propanediol concentrations, and the composition is prepared as recited in claim 1.

18. A cationic thermosetting water soluble polyaminopolyamide-epichlorohydrin resin prepared as recited in claim 14.

* * * * *

UNITED STATES PATENT AND TRADEMARK OFFICE
CERTIFICATE OF CORRECTION

PATENT NO. : 5,171,795
DATED : December 15, 1992
INVENTOR(S) : Andrew J. Miller and Brian M. Stubbs It is certified that error appears in the above-indentified patent and that said Letters Patent is hereby corrected as shown below:

Col. 6, Claim 2, line 40, "sulphuric acid" should read --sulfuric acid--;

Col. 6, Claim 3, line 43, "sulphuric acid" should read --sulfuric acid--; and

Col. 8, Claim 15, line 21, "sulphuric acid" should read --sulfuric acid--.

Signed and Sealed this

Fourteenth Day of December, 1993

Attest:

BRUCE LEHMAN

*Attesting Officer*    *Commissioner of Patents and Trademarks*